(12) United States Patent
Blunk et al.

(10) Patent No.: US 9,054,347 B2
(45) Date of Patent: Jun. 9, 2015

(54) REVERSIBLE SUPERHYDROPHILIC-SUPERHYDROPHOBIC COATING FOR FUEL CELL BIPOLAR PLATES AND METHOD OF MAKING THE SAME

(75) Inventors: Richard H. Blunk, Macomb Township, MI (US); Mahmoud H. Abd Elhamid, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 812 days.

(21) Appl. No.: 12/684,149

(22) Filed: Jan. 8, 2010

(65) Prior Publication Data

US 2011/0171564 A1    Jul. 14, 2011

(51) Int. Cl.
| | | |
|---|---|---|
| *H01M 8/00* | (2006.01) | |
| *H01M 4/88* | (2006.01) | |
| *H01M 4/02* | (2006.01) | |
| *H01M 2/00* | (2006.01) | |
| *H01M 8/02* | (2006.01) | |
| *H01M 8/04* | (2006.01) | |
| *H01M 8/10* | (2006.01) | |

(52) U.S. Cl.
CPC .......... *H01M 8/021* (2013.01); *H01M 8/0228* (2013.01); *H01M 8/04126* (2013.01); *H01M 8/04171* (2013.01); *H01M 2008/1095* (2013.01); *Y02E 60/50* (2013.01)

(58) Field of Classification Search
CPC ....... H01M 8/00; H01M 8/02; H01M 8/0206; H01M 8/0228; H01M 8/0245; H01M 8/1002; H01M 8/1004; H01M 8/1018; H01M 8/1023; H01M 8/1027; H01M 8/1039; H01M 8/1072; H01M 8/1081
See application file for complete search history.

(56) References Cited

U.S. PATENT DOCUMENTS

| | | | |
|---|---|---|---|
| 7,270,909 B2 | 9/2007 | Beutel et al. | |
| 2008/0107944 A1 | 5/2008 | Goebel | |
| 2008/0292940 A1* | 11/2008 | Xie | ................................ 429/34 |
| 2009/0286133 A1* | 11/2009 | Trabold et al. | .................. 429/34 |

OTHER PUBLICATIONS

Fadeev et al, A New Route to Covalently Attached Monolayers: Reaction of Hydridosilanes with Titanium and Other Metal Surfaces, 12184-85 J. Am. Chem. Soc. (1999).*
"A New Route to Covalently Attached Monolayers: Reaction of Hydridosilanes with Titanium and Other Metal Surfaces" A. Fadeau et al, J. Am. Chem.Soc., 121, 12184, 1999.
"Stable Superhydrophobic Coatings from Polyelectrolyte Multilayers" Lei Zhai, Fevzi C. Cebeci, Robert E. Cohen, Michael F Rubner, American Chemical Society May 5, 2004.

* cited by examiner

*Primary Examiner* — Yoshitoshi Takeuchi
(74) *Attorney, Agent, or Firm* — BrooksGroup

(57) ABSTRACT

One variation may include a method which may include depositing a hydrophilic coating over at least a portion of a fuel cell bipolar plate. The bipolar plate may include a reactant gas header opening communication with the plurality of tunnels. Moreover, the tunnels may be communicating with a plurality of channels which may be defined by reactant gas flow field which may include a plurality of lands. At least a portion of the hydrophilic coating may be reacted with the material including a hydrophobic group which may provide a hydrophobic portion. Thereafter, at least a portion of the hydrophobic portion comprising oxidizing the hydrophobic group may be removed in order to regenerate the hydrophilic coating.

7 Claims, 1 Drawing Sheet

REVERSIBLE SUPERHYDROPHILIC-SUPERHYDROPHOBIC COATING FOR FUEL CELL BIPOLAR PLATES AND METHOD OF MAKING THE SAME

TECHNICAL FIELD

The field to which the disclosure generally relates to includes fuel cell bipolar plates and methods of making the same.

BACKGROUND

A variety of fuel cells produce water as a byproduct or utilize membranes such as, but not limited to, proton exchange membranes which must be humidified for acceptable performance. Water condensation during operation or shut down can result in reactant gas flow fields or tunnels being blocked by retained water or ice.

SUMMARY OF EXEMPLARY EMBODIMENTS OF THE INVENTION

One exemplary embodiment includes a fuel cell bipolar plate having a reversible superhydrophilic-superhydrophobic coating thereon.

Another exemplary embodiment includes providing a fuel cell bipolar plate having a hydrophilic surface, reacting a material with at least a portion of the hydrophilic surface to change a portion of the surface to be hydrophobic thereby providing a hydrophobic portion, and oxidizing at least a portion of the hydrophobic portion to remove the same and regenerate the hydrophilic surface.

Another exemplary embodiment includes a method of providing a fuel cell bipolar plate having a metal oxide layer formed there over, reacting the metal oxide with a material including a hydrophobic alkyl group to create a hydrophobic portion, and oxidizing at least a portion of the hydrophobic portion to remove the same and regenerate the hydrophilic surface.

Another exemplary embodiment of the invention includes providing a fuel cell bipolar plate having a hydrophilic coating thereon comprising titanium oxide, reacting the hydrophilic coating with octadecylsilane to provide a hydrophobic portion, and oxidizing at least a portion of the hydrophobic portion to remove the same to regenerate the hydrophilic layer including titanium oxide.

Another exemplary embodiment includes a fuel cell bipolar plate including a reactant gas header opening communicating with a first portion including a plurality of tunnels defined therein, the first portion communicating with a reactant gas flow field having a plurality of channels defined therein, and a superhydrophilic-superhydrophobic coating over at least a portion of the tunnels.

Another exemplary embodiment includes a method comprising providing a fuel cell bipolar plate including a reactant gas header opening communicating with a plurality of tunnels, the tunnels communicating with a plurality of channels defined by a reactant gas flow field including a plurality lands, coating at least a portion of the fuel cell bipolar plate with a metal oxide to create a hydrophilic layer, reacting n-octadecylsilane with the hydrophilic layer to create a hydrophobic silyl hydride layer, and thereafter oxidizing and removing the hydrophobic silyl hydride layer to regenerate the hydrophilic layer.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
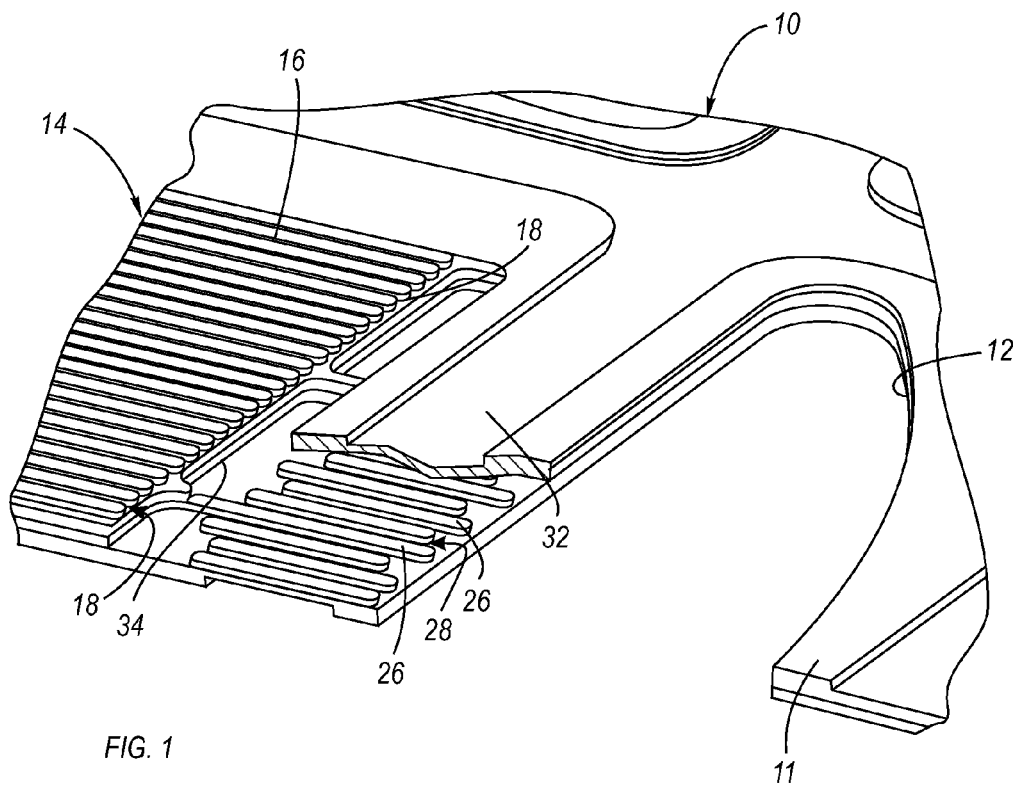
FIG. 1 is a perspective view illustrating a fuel cell bipolar plate according to one exemplary embodiment of the invention.

Referring now to FIG. 1, one exemplary embodiment includes a fuel cell bipolar plate 10 including a reactant gas header 11 having an opening 12 therein for the flow of reactant gas therethrough. The reactant gas header opening 12 communicates with a plurality of tunnels 28 defined by a first set of lands 26. A cover 32 is provided over the tunnels 28. The tunnels 28 direct and funnel reactant gases toward a reactant gas flow field 14. The reactant gas flow field is defined by a second set of lands forming a plurality of reactant gas flow channels 18. The spacing of the tunnels 28 is typically wider than the spacing of the channels 18. In one embodiment feed ports 34 may be positioned between the tunnels 28 and the channels 18. The feed ports function to provide uniform gas distribution through the bipolar plate channels and the weld line joining the cathode and anode sides of the bipolar plate that is situated between the gas channels 18 and fee ports 34 prevents reactant gases from intruding into the coolant channels and coolant from intruding into the reactant channels 18. A port/tunnel design is required to enable the weld line. In one exemplary embodiment, a portion of the bipolar plate may include a layer including the reactant product of a hydrophilic material and a material including a hydrophobic group to provide a hydrophobic portion over at least a portion of the bipolar plate. In one embodiment the hydrophobic portion may cover the reactant gas flow field including at least the channel 18 portions thereof and the tunnels 28 leading to the reactant gas flow field 14. In one embodiment a portion of the hydrophobic portion may be oxidized and removed to leave a hydrophilic component remaining thus converting a portion of the hydrophobic portion to a hydrophilic surface. In one embodiment, the hydrophobic group may be an alkyl group. In one embodiment, the hydrophilic component may be a metal oxide such as, but not limited to, titanium oxide. In one embodiment, the hydrophobic material may include, but is not limited to, n-octodecylsilane $CH_3(CH_2)_{16}(CH_2SiH_3)$. In one embodiment, the material on the fuel cell bipolar plate prior to oxidation includes a covalent M-O—Si bond, where M is a metal such as, but not limited to, titanium. In one embodiment, the use of a reversible superhydrophilic-superhydrophobic coating may be advantageous where portions to be coated with a hydrophobic coating are covered. The coating on uncovered portions of the bipolar plate may be oxidized by, for example, exposure to UV light to remove the hydrophobic group and regenerate the hydrophilic coating.

One exemplary embodiment of the invention includes a method of providing a stainless steel fuel cell bipolar plate coated with gold and cleaning the bipolar plate with open air plasma to enhance wetting. A superhydrophilic coating is applied to the bipolar plate, for example, by applying an aqueous-based titania solution via dipping, spraying or brushing the solution onto the bipolar plate and drying the same, for example, with a heat gun to form a coating thereon which is superhydrophilic. The superhydrophilic portion of the bipolar plate may be reactive with a material including a hydrophobic group. For example, the superhydrophilic bipolar plate may be dipped in about 0.1 to 10 weight percent, and preferably about five weight percent n-octadecylsilane (in hexane) solution and flash dried (20 seconds at room temperature) to generate self assembled monolayers "SAM" on the titanium oxide surface to provide a coating that is superhydrophobic. Thereafter, superhydrophilic regions may be selectively regenerated by exposing the super hydrophobic coating to UV radiation to oxidize and remove the silicon hydrophobic portion and to regenerate the titanium oxide.

In one exemplary embodiment, the hydrophilic coating is deposited over the tunnels 28 and the channels 18. Thereafter, a hydrophobic material is reacted with the hydrophobic coating and bonded thereto to form a hydrophobic portion over at least a portion of the fuel cell bipolar plate. The hydrophobic portion may cover at least a portion of the surfaces defining the tunnels and at least a portion of the surfaces defining channels. Thereafter, the hydrophobic portion over the channels is oxidized, for example, by UV radiation to remove the hydrophobic component leaving the hydrophilic component (e.g. titanium oxide). The resultant fuel cell bipolar plate includes a hydrophobic portion over the tunnels and a hydrophilic portion over the channels. Leaving the hydrophobic portion over the tunnels 28 provides the advantage of facilitating liquid water purge from the channels to the headers during shut down and, as a result, shorter start times from freeze conditions are realized as ice formation in channels is eliminated allowing reactant gas to reach the electrodes for fuel cell power.

Figure 2:
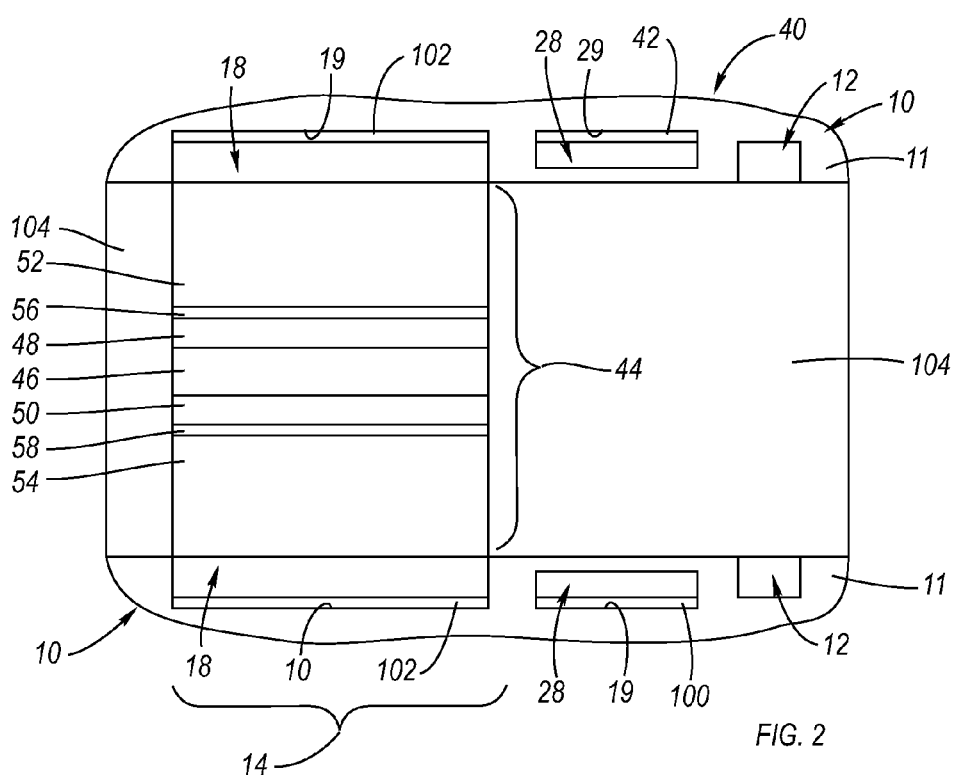
FIG. 2 is a sectional view of a portion of a fuel cell stack including a plurality of fuel cell bipolar plates according to one exemplary embodiment of the invention.

FIG. 2 illustrates a portion of a fuel cell stack 40 including a plurality of fuel cell bipolar plates 10 which include a reactant gas flow field defined by a plurality of lands 16 and channels 18. A superhydrophilic-superhydrophobic coating 42 may be deposited over at least a portion of the fuel cell bipolar plate 10, for example over at least a portion of the surface(s) 19 defining the channels 18 and over at least a portion of the surface(s) defining the tunnel 28. Thereafter, the superhydrophilic-superhydrophobic coating over the channel surface 19 may be exposed to UV light to remove the hydrophobic component and regenerate a hydrophilic coating 102. A soft goods portion 44 may be sandwiched between bipolar plates 10. The soft goods portion 44 may include a membrane 46 such as a proton exchange membrane including an ionomer. An anode 48 and a cathode 50 may be deposited over opposite faces of the membrane 46. The cathode and the anode may include a catalyst which may be supported and may include an ionomer (e.g. on carbon particle) or not supported. A first gas diffusion media layer 52 may be provided over the anode 48 and similarly a second gas diffusion media layer 56 may be provided over the cathode 50. The gas diffusion media layers 42, 54 may include, but are not limited to, a plurality of fibers in the form of a porous paper, mat or felt to facilitate the diffusion of reactant gases from the channels 18 of the bipolar plate 10 to the anode 48 and cathode 50, respectively. Optionally, a first microporous layer 56 may be provided between the first gas diffusion media layer 52 and the anode 48. Likewise, a second micro porous layer 58 may be provided between the second gas diffusion media layer 54 and the cathode 50. The microporous layers 56, 58 may be constructed or arranged to control the flow of water through the soft goods portion. In one exemplary embodiment, the microporous layers 56 and 58 may include a plurality of carbon particles bound together by polytetrafluoroethylene. One or more gaskets 104 may be used for sealing.

Another exemplary embodiment may include a method including providing a fuel cell bipolar plate including a reactant gas header opening communicating with a plurality of tunnels, the tunnels communicating with a plurality of channels defined by a reactant gas flow field including a plurality lands, coating at least a portion of the fuel cell bipolar plate with a metal oxide to create a hydrophilic layer, reacting n-octadecylsilane with the hydrophilic layer to create a hydrophobic silyl hydride layer, and thereafter oxidizing and removing the hydrophobic silyl hydride layer to regenerate the hydrophilic layer, wherein the oxidizing and removing the hydrophobic silylhydride layer comprises exposing the silylhydride layer to open air plasma.

Another exemplary embodiment may include A method including providing a fuel cell bipolar plate including a reactant gas header opening communicating with a plurality of tunnels, the tunnels communicating with a plurality of channels defined by a reactant gas flow field including a plurality lands, coating at least a portion of the fuel cell bipolar plate with a metal oxide to create a hydrophilic layer, reacting n-octadecylsilane with the hydrophilic layer to create a hydrophobic silyl hydride layer, and thereafter oxidizing and removing the hydrophobic silyl hydride layer to regenerate the hydrophilic layer, wherein the oxidizing and removing the hydrophobic silylhydride layer comprises exposing \the silylhydride layer to UV radiation, wherein the UV radiation has different intensity across the plate surface area generating a spatial gradient of surface hydrophilicity/hydrophobicity wherein the magnitude of hydrophilicity/hydrophobicity varies over the plate surface.

Another exemplary embodiment may include a method including providing a fuel cell bipolar plate comprising a stainless steel surface providing a hydrophilic layer, the bipolar plate including a reactant gas header opening communicating with a plurality of tunnels, the tunnels communicating with a plurality of channels defined by a reactant gas flow field including a plurality lands, reacting n-octadecylsilane with the hydrophilic layer to create a hydrophobic silyl hydride layer, and thereafter oxidizing and removing the hydrophobic silyl hydride layer to regenerate the hydrophilic layer.

The above description of embodiments of the invention is merely exemplary in nature and, thus, variations thereof are not to be regarded as a departure from the spirit and scope of the invention.

What is claimed is:
1. A method comprising:
depositing a hydrophilic coating over at least a portion of a fuel cell bipolar plate, the bipolar plate including a reactant gas header opening communicating with a plurality of tunnels, the tunnels communicating with a plurality of channels defined by a reactant gas flow field including a plurality of lands, reacting a portion of the hydrophilic coating with a material including a hydrophobic group, to provide a hydrophobic portion, and thereafter removing at least a portion of the hydrophobic portion comprising oxidizing the hydrophobic group to regenerate the hydrophilic coating and wherein the reaction may be a chemical or physical reaction.

2. A method as set forth in claim 1 wherein the hydrophilic coating comprises a metal oxide.

3. A method as set forth in claim 1 wherein the hydrophilic coating comprises titanium oxide.

4. A method as set forth in claim 1 wherein the hydrophobic material comprises a hydrophobic alkyl group.

5. A method as set forth in claim 1 wherein the hydrophobic material comprises n-octadecylsilane.

6. A method as set forth in claim 1 wherein the reaction product hydrophilic coating and the material including a hydrophobic group comprises a material having the formula of the Ti—O—Si—R, where R is a hydrophobic alkyl group.

7. A method as set forth in claim 1 wherein oxidizing comprises using UV radiation.

* * * * *